J. H. ANDERSON.
Improvement in Land-Markers.
No. 131,045. Patented Sep. 3, 1872.
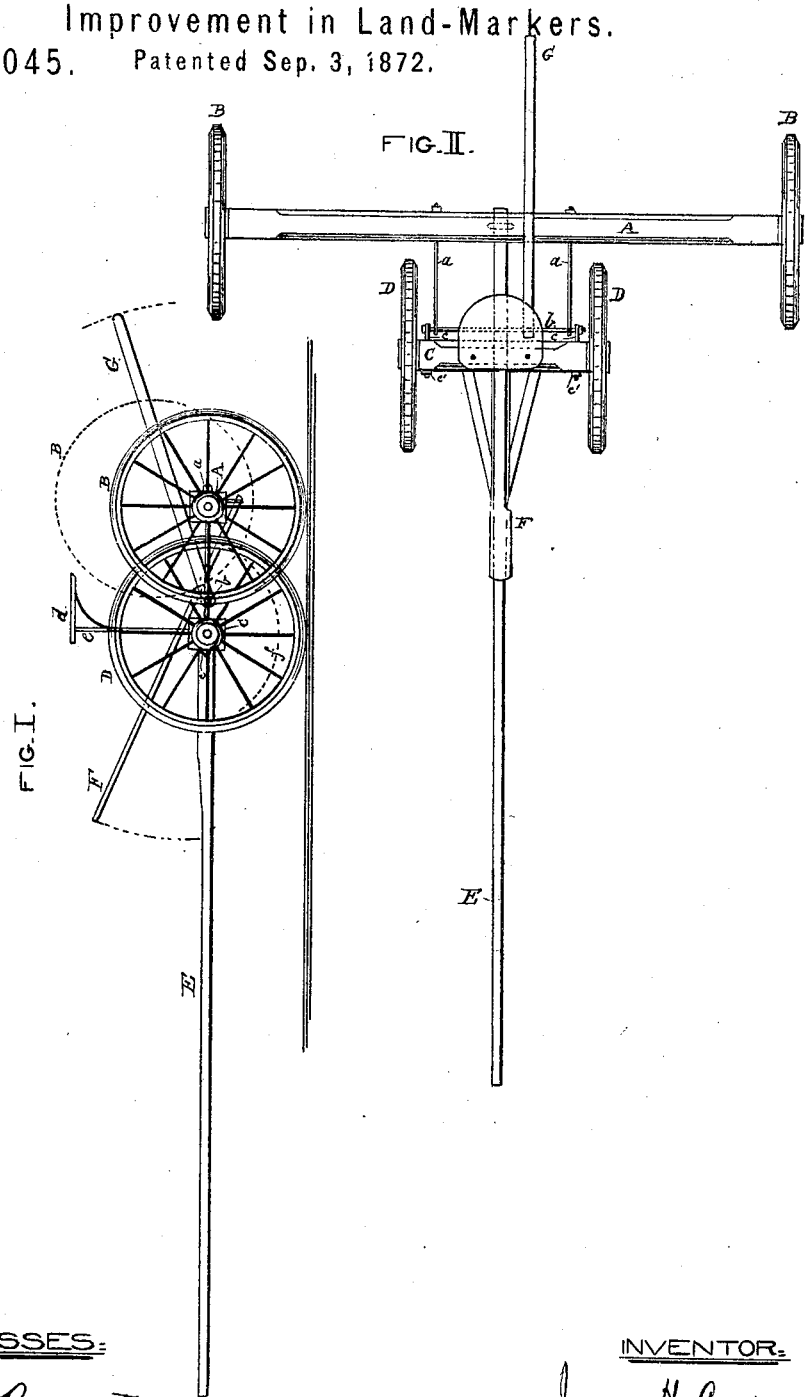

UNITED STATES PATENT OFFICE.

JAMES H. ANDERSON, OF HILLSBOROUGH, OHIO, ASSIGNOR OF ONE-HALF OF HIS RIGHT TO JOHN LEWIS, OF SAME PLACE.

IMPROVEMENT IN LAND-MARKERS.

Specification forming part of Letters Patent No. 131,045, dated September 3, 1872.

*To all whom it may concern:*

Be it known that I, JAMES H. ANDERSON, of Hillsborough, in the county of Highland and State of Ohio, have invented certain Improvements in Land-Markers, of which the following is a specification; and I do hereby declare that the same is a full, clear, and exact description of my said invention, reference being had to the accompanying drawing and to the letters of reference marked thereon.

My invention relates to a device for marking or cross-marking a field preparatory to planting corn therein; and consists of a wheeled vehicle, the driving of which over the field marks it with parallel lines equally distant apart, and which may be crossed by a similar driving of the vehicle from a direction at right angles with the lines first marked. I preferably use the machine to mark the field only with parallel lines or furrows, afterward using a combined plow and corn-planter to cut the cross-furrows and deposit the hills of corn at the intersected points; but when the field is crossed with lines by driving my machine at right angles I use any ordinary hand-planter or jumper to deposit and cover the hills of corn at the intersections.

In the accompanying drawing, forming a part of this specification, Figure 1 is a side view of my invention; Fig. 2 is a plan of the same.

Similar letters of reference indicate similar parts of my invention in both figures.

A is a back or rear axle, having upon it two wheels, B. C is a front and shorter axle, having upon it two wheels, D. The back and front axles are connected by the rods $a$, which are hinged upon the rod $b$, secured to the front axle by means of the bolts $c'$. The shaft or tongue of the vehicle is attached to the front axle and represented by E. The driver's seat is shown by $d$, and supported by standards $e$, extending perpendicularly from the front axle.

When it is desired to use the machine, the horses are harnessed up and put to it in the ordinary manner; and by them the machine is drawn forward over the field, the wheels B B and D D marking or rutting it into parallel lines, which, from the respective positions of the wheels, are equally distant from each other.

When it is desired to turn, the driver places his foot upon the lever F, hinged to the front axle, exerting sufficient force to raise the rear axle A to about the position indicated in Fig. 1 by the dotted lines. The vehicle is then, in consequence of the narrow gage of the front wheels D, placed in a condition for turning with facility. If it should be necessary to back the horses and machine, the operation is facilitated, and the strain and weight upon the animals reduced, by the driver putting his weight upon the end of the lever G, hinged upon the rod $b$, by which means the front wheels may be elevated and removed from contact with the ground. The position to which they would thus be brought is shown by the dotted arc $f$ of the periphery of the front wheels.

Should the use of the machine be required in a field in which, or in parts thereof, width or space is deficient, the rear axle and wheels may be disconnected and detached by means either of the removal of the nuts $c'$ upon the bolts $c$, or the rod $b$ from the same bolt. By either mode of detachment the front wheels and axle with the shaft would then form the entire machine.

By means also of the facilities for raising the front and rear wheels of the machine they can be made to clear or jump any obstructions lying in the way of their track, such as stumps, stones, or the like.

In other machines of the class to which my invention belongs great difficulty and inconvenience are experienced by the driver and horses in turning the machine to the right or left to avoid such obstacles as are generally found in fields; but by the arrangement of levers herein shown as attached to my machine its wheels can be readily made to jump or clear obstructions of whatever kind, to the height of about two feet, without any undue exertion on the part of the driver.

Having thus described my invention, what I claim as new, and wish to secure by Letters Patent of the United States, is—

A field-marker, consisting of the wheels B B and D D upon axles A and C, connected by means of the parts $a$, $b$, $c$, and $c'$, in combination with the levers F and G, the whole constructed and to operate substantially as hereinbefore set forth.

JAMES H. ANDERSON.

Witnesses:
GEORGE H. HOWARD,
EDM. F. BROWN.